United States Patent [19]

Isshiki et al.

[11] 3,969,208

[45] July 13, 1976

[54] ULTRASONIC APPARATUS

[75] Inventors: Setsuya Isshiki; Tetsuo Shiromizu; Hiroto Oshima, all of Tokyo; Kozo Okada, Nagoya; Kiyoshi Kazunaga; Eiji Mori, both of Tokyo, all of Japan

[73] Assignees: The Fujikura Cable Works, Ltd., Tokyo; NGK Spark Plug Co., Ltd., Nagoya; Seidensha Electronics Co., Ltd., Tokyo, all of Japan

[22] Filed: Apr. 8, 1974

[21] Appl. No.: 458,971

[30] Foreign Application Priority Data

Apr. 13, 1973 Japan .............................. 48-041428

Apr. 13, 1973 Japan .............................. 48-041429

[52] U.S. Cl. .............................................. 204/193

[51] Int. Cl.$^2$ .............................................. B01J 1/12

[58] Field of Search ...................... 340/8 S, 1 L, 15; 310/9.1, 9.2, 9.3, 9.4; 277/2, 72, 22; 188/1 B; 259/DIG. 41, DIG. 44; 68/3 SS; 73/53, 59, 67.1, 67.2; 204/193

[56] References Cited

UNITED STATES PATENTS

| | | | |
|---|---|---|---|
| 2,498,737 | 2/1950 | Holden | 259/DIG. 44 |
| 3,088,744 | 5/1963 | Ezekiel et al. | 277/72 |
| 3,141,523 | 7/1964 | Dickie | 188/1 B |
| 3,210,724 | 10/1965 | Jones et al. | 340/5 R |
| 3,246,516 | 4/1966 | Maropis | 73/67.1 |
| 3,264,863 | 8/1966 | Maropis | 73/67.1 |
| 3,589,475 | 6/1971 | Alford | 188/1 B |
| 3,730,489 | 5/1973 | Morita | 68/3 SS |
| 3,790,079 | 2/1974 | Berglund et al. | 259/DIG. 44 |

*Primary Examiner*—Maynard R. Wilbur

*Assistant Examiner*—T. M. Blum

*Attorney, Agent, or Firm*—Woodhams, Blanchard and Flynn

[57] ABSTRACT

In the ultrasonic apparatus being so constructed as to be capable of directing the oscillation of ultrasonic waves to the inner part of a container and the like, an ultrasonic apparatus characterized by the provision of an ultrasonic wave transfer preventive member to ensure the prevention of transfer of ultrasonic waves to unintended matters other than the object matter.

15 Claims, 8 Drawing Figures

ULTRASONIC APPARATUS

BACKGROUND OF THE INVENTION

1. Field of the Invention

The present invention relates to an apparatus for oscillating ultrasonic waves to the inner part of a container and the like.

2. Description of the Prior Art

The present inventors have energetically continued their studies regarding the utilization of ultrasonic waves for mainly the curing of rubber, plastics and so forth. The Japanese patent application No. 81041/1972 filed by them previously forms a part of the result of a series of such studies. The essential part of an ultrasonic apparatus proposed in said application to serve for said purpose is, as illustrated by FIG. 1 of the appended drawings, composed of a metal tube A and the oscillating member connected directly with said metal tube A, said oscillating member consisting of a ring-shaped metallic resonator B with its inner circumference being exposed on the inner wall of said metal tube A, an electromechanical transducing element C connected with its other circumference of said resonator B either directly or through a horn D, said metal tube A being coupled with curing tubes E (for the manufacture of, for instance, electric wires or cables) by means of a flange coupling F, whereby the oscillation of ultrasonic waves can be directed to the center of the metal tube being subjected to internal pressure in particular. An ultrasonic apparatus having such a construction is surely capable of oscillating and applying ultrasonic energy of a great output to the inner part of a metal tube, but it has been found that the efficiency of this apparatus is not so high due to the fact that ultrasonic waves are also transferred from the joint of the ring metal resonator and the metal tube to parts other than the intended part by way of the metal tube.

SUMMARY OF THE INVENTION

The present invention relates to an improved ultrasonic apparatus, which is characterized by an improvement on the above described ultrasonic apparatus composed of a container, such as a metallic or ceramic tubular body, and a single or plural number of ring-shaped oscillating members made of, e.g. a ring-shaped metallic resonator, an electromechanical transducing element, a horn, etc., so as not to completely radiate ultrasonic waves to the inner part of said container, which improvement ensures the prevention of transfer of ultrasonic waves to unintended matters, other than the object matter, by virtue of employment of an ultrasonic wave transfer preventing means.

DESCRIPTION OF THE PREFERRED EMBODIMENTS

The ultrasonic apparatus intended by the present invention is applicable to ultrasonic waves having a frequency of about 20 – 50 KHz for use in ultrasonic welding machines, ultrasonic washing machines and so on, and it is particularly suitable for ultrasonic waves with a high frequency of more than 100 KHz which have a great ultrasonic effect. At times, the frequency of the applicable ultrasonic waves may be as high as several MHz. As is known, the higher the frequency the shorter the wave length so that as a result, things not anticipated in the conventional technique regarding ultrasonic waves have come to light. For instance, in the case of the employment of an ultrasonic resonator made of iron in a curing tube for the manufacture of electric wires and cables, while the wavelength of ultrasonic waves transmitting through the iron resonator is about 100 mm at the time of applying a frequency of 50 KHz, it becomes about 10 mm when the frequency is increased to about 500 KHz; that is, there is observed a wide difference in wavelength. This fact proves that the conventional technique concerning ultrasonic wave of a low frequency is not applicable ultrasonic waves of a high frequency.

And, in the case of polyethylene, ultrasonic waves transmit therethrough, at the speed of 2000 m/sec, and the wavelength is 50 mm at a frequency of 40 KHz and 5 mm at a frequency of 400 KHz. Accordingly, the distance from an antinode (loop) to next antinode (loop) of the vibration of ultrasonic waves is 25 mm (i.e., 50 mm/2) and 2.5 mm (i.e., 5 mm/2), respectively. However, the insulating covering layer for the electric wire, cable and the like has a thickness of at most about 25 mm at present, and this thickness is equivalent to a distance to be barely covered by a half-wavelength ($\lambda/2$, $\lambda$ = wavelength) of ultrasonic waves with a frequency of 40 KHz. Therefore, when ultrasonic waves having such a long wavelength are applied to the foregoing covering layer, there takes place a phenomenon called 'hot spot' on which the ultrasonic wave energy concentrates, hampering uniform heating of the covering layer. Such a phenomenon is also attendant on the utilization of ultrasonic waves for other various purposes, in addition to the manufacture of electric wires and cables as above, and therefore, their utilization is often limited.

As discussed in the foregoing, the inferiority in efficiency of an ultrasonic apparatus having the previously proposed construction is ascribable to the fact that the ultrasonic waves, to be convergently radiated from the ring metal resonator, are partly transferred or transmitted to the curing tube from the joint of said resonator and the container through other parts such as the metal container and the flange joint thereof, resulting in a great loss of ultrasonic waves. As a means of overcoming the foregoing defects, it is conceivable to weld the metal tube onto said resonator exactly at the node of ultrasonic waves therein. But where such a container is to be subject to internal pressure, its wall must be of considerable thickness so that it is difficult to perform the welding at the node to perfection; especially in an ultrasonic apparatus utilizing high-frequency ultrasonic waves, the wavelength is short as set forth above so that the overlapping of a greater part or the entirety of a wavelength within the wall of the container is unavoidable. Therefore, it has been impossible to prevent completely the transfer of ultrasonic waves from the resonator to other parts of the apparatus. As the effective means for transferring ultrasonic waves to an object within a container such as metal tube, there is known a means of using a medium, such as a liquid, filling said tube. As the medium for this purpose, a heat transfer medium with high temperature and high pressure is sometimes employed, and in that event, said high temperature and high pressure pose a problem calling for a special consideration. That is to say, it is desirable that the ultrasonic apparatus to be of such a construction as to settle these problems at the same time.

In the case of employing a high-temperature heat transfer medium, for instance, the heat of said heat transfer medium is transferred to the oscillating member, comprising an electromechanical transducing element such as a piezo-electric element and so forth, through the ultrasonic resonator, thereby bringing on a rise in temperature of said oscillating member. On this occasion, especially when the piezo-electric element made of barium titanate, lead titanate - zirconate or the like is employed, the stability of the apparatus should be ensured by maintaining it at as low and fixed a temperature as possible in view of the relation between the temperature and the Curie point of said piezo-electric element as well as the deterioration thereof. These problems must be settled, too.

The present invention seaks to provide an improved ultrasonic apparatus which not only is capable of efficiently transferring ultrasonic waves to the object within a metal tube in the main but also is sufficient in strength and other conditions for use as a pressure container and capable of settling the foregoing problems to perfection. The essential point of this apparatus characterizing the present invention is the provision of an ultrasonic wave transfer preventive member being capable of preventing the transfer of ultrasonic waves and having the minimum possible area of contact with the resonator, said transfer preventive member being disposed between the container (such as a metal tube) and the metal annular (ring-or tube-shaped) oscillating member (comprising the resonator, the piezo-electric element and so forth), or between said tube and said oscillating member as well as between each two adjoining oscillating members. And, in the apparatus having such a construction, it is preferable to provide a ring-shaped packing so devised as to make a line contact with the resonator on a position corresponding at least one of the nodes of ultrasonic waves. Such apparatus also may be constructed by applying a plural number of said packings to the lateral plane surfaces of the resonators so as to introduce cooling medium through the space to be formed by the thus disposed packings. It is desirable that such packing be structural to minimize its area of contact with at least the resonator, and preferably with both the container and the resonator - specifically, be structural to effect a line contact. For instance, a ring packing having a polygonal cross-section such as triangular cross-section, rhombic cross-section and the like is effective. However, in the case of a packing merely for the purpose of forming a liquid-tight space for introducing a cooling medium therein, the packing configuration is not limited to that described in the foregoing.

BRIEF DESCRIPTION OF THE DRAWING

In the accompanying drawings.

DETAILED DESCRIPTION OF THE INVENTION

The present invention is to provide an ultrasonic apparatus which is suitable for various uses and can minimize the loss of ultrasonic waves. Particularly it relates to an ultrasonic apparatus which is suitable for the utilization of ultrasonic waves having a high frequency.

Figure 1:
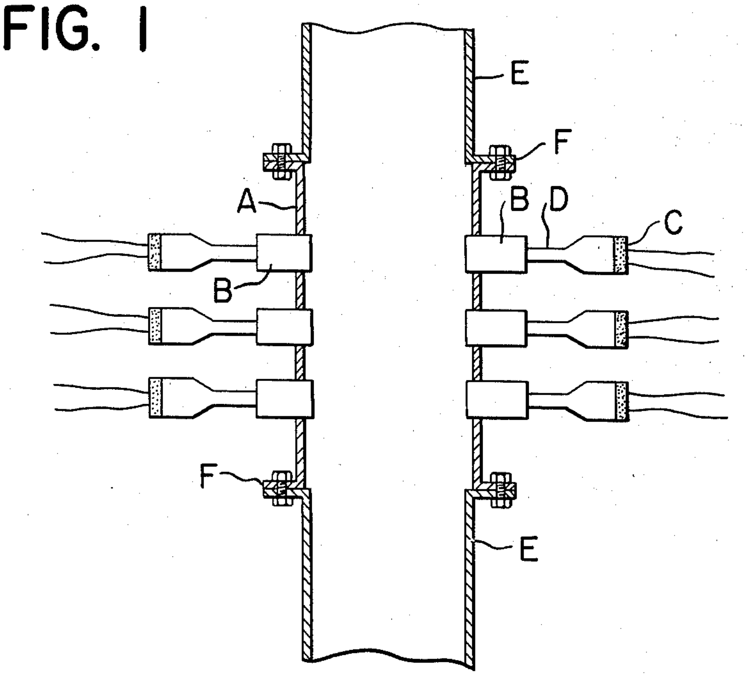
FIG. 1 is a diagrammatic cross-sectional view of a part of a conventional ultrasonic apparatus.

The ultrasonic apparatus proposed previously by the present inventors is composed of a metal container A (FIG. 1) and a single or plural number of generally metallic ring-shaped oscillating members (e.g. comprising the metallic ring-shaped resonator B, an electromechanical transducing element C, such as a piezo-electric element, lead wires and so on) as either directly conjoined or formed in a body by cutting and joined to other apparatuses E by means of flange couplings F. An apparatus of such a construction, however, has been found to be defective in that its efficiency of transferring ultrasonic waves to an object is not so high because of the transfer of ultrasonic waves to other parts through the oscillating member, metal tube or flange-coupling portion.

The present invention overcomes such defects in the previous apparatus, and substantially it is characterized by the provision of an ultrasonic wave transfer preventive member having an effect of preventing the transfer of ultrasonic waves through the connection of the metal ring resonator to the metal container in the foregoing apparatus. Particularly it is characterized by the provision of an ultrasonic wave transfer preventive member having the least possible area of contact with the resonator on a position corresponding to the node of ultrasonic waves.

Hereunder will be given full particulars of the present invention with reference to the accompanying drawings.

Those shown in FIG. 3 through FIG. 7 are apparatuses of a very desirable structure according to the present invention. Therefore, the apparatuses of this structure will be first explained.

Figure 2A:
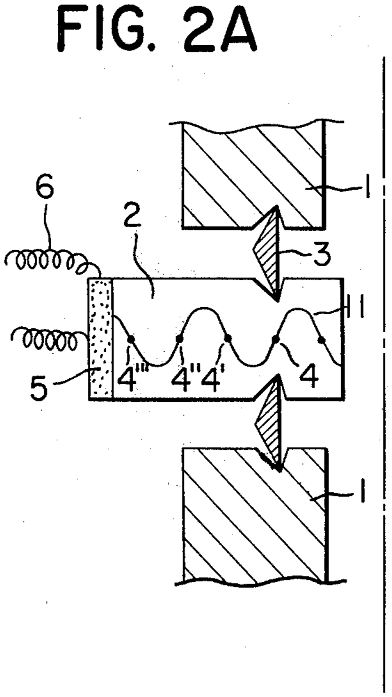
FIGS. 2-A and -B are cross-sectional views, on an enlarged scale, of the oscillating member of an ultrasonic apparatus embodying the present invention, which show the relation between a ring-shaped packing (triangular and rhombic, respectively) and the node of ultrasonic waves.
Figure 2B:
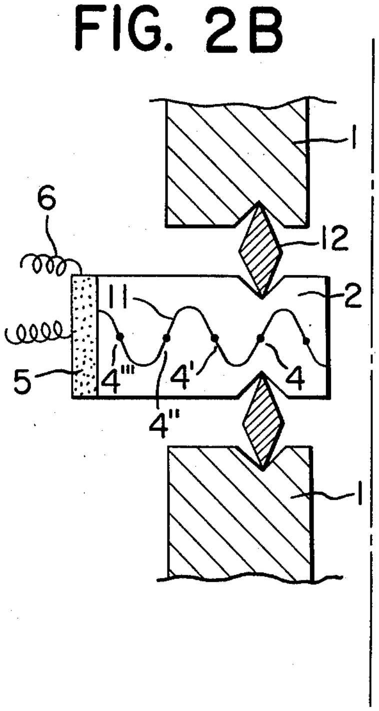
Figure 3:
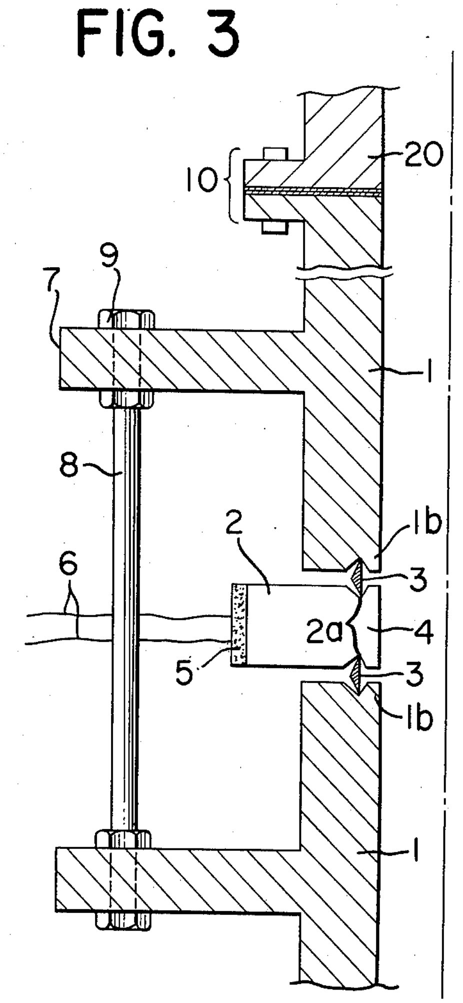
FIG. 3 is a cross-sectional view of an ultrasonic apparatus embodying the present invention, which is illustrative of the case wherein a triangular packing is employed as the ultrasonic wave transfer preventive member.

FIGS. 2-A and -B show clearly the relation between the position of packing and the ultrasonic waves in an apparatus provided with an ultrasonic wave transfer preventive member formed by connecting the metal ring-shaped resonator 2 with the container comprising the metal tube 1, by means of a ring packing 3 or 12 having a shape convenient for making a line contact with both said resonator and metal tube. This packing 3 or 12 is disposed to correspond to one of the nodes 4, 4', 4'' . . . (the drawing shows the case wherein the packing is disposed to correspond to the node 4) of the ultrasonic waves 11 within the resonator 2. Referring to FIG. 3 for further elucidation, the resonator 2 consists of a metal ring with its circumference left intact or shaped into either an equilateral or regular flat facet. Grooves 2*a* and 1*b*, each having a substantially V-shaped cross-section are circularly cut on the lateral plane face of the metallic ring-shaped resonator 2, on a position corresponding to the node 4 of ultrasonic waves therein, on the metal tube 1 at a position corresponding to said node 4, respectively. The tube 1 and resonator 2 are conjoined through the ring packing 3 having, for instance, a triangular cross-section fitted in said grooves 2*a* and 1*b*, thereby forming an ultrasonic wave transfer preventive member. For the purpose of fixing the parts of said member, the flanges 7 provided on the tube 1 are connected by the bolt-type connecting rod 8 so as to adjust the clamping power by means of the nut 9. The reference numeral 5 in the drawing denotes the electromechanical transducing element such as a piezo-electric element consisting of barium titanate, lead titanate - zirconate or the like, 6 denotes the lead wires being connected with an ultrasonic wave generator not shown herein. As the material for said packing, such metals as iron, stainless steel, titanium alloy, aluminum and copper, and materials such as rubber, polyfluoroethylene and asbestos are applicable; but materials other than metals are not so desirable because they show much deformation. The selection of these materials for the packing depends on the medium, pressure and other conditions to be applied. The tube 1 is joined to, for instance, the curing tube 20 for use in manufacturing electric wires and cables and other apparatuses by means of the flange coupling 10.

In an apparatus having such a structure as above, inasmuch as a triangular packing with a structure capable of providing a line contact involving an extremely small area of contact between the resonator 2 and the tube 1 is installed at a position corresponding to the node of ultrasonic waves, there is little transfer of ultrasonic waves to the tube. Besides, because of the triangular packing characterized by a great flexural rigidity, this apparatus shows only a minor degree of deflection against the internal pressure of the tube and is also mechanically stiff, so that it is an apparatus of desirable type. Furthermore, as an apparatus of such a structure renders it possible to form a groove of V-shape or the like exactly at a position corresponding to the node of ultrasonic waves in the resonator at the time of manufacturing it, a very satisfactory ultrasonic wave transfer prevention effect can be expected. In addition, according to this structure, even when the clamping power is strengthened by means of the bolt and nut to prevent a leakage due to internal pressure, there is little decrease in the oscillation of ultrasonic waves into the tube; it has proved to be applicable even when the internal pressure is considerably high, such as more than 50 $Kg/cm^2$.

Figure 4:
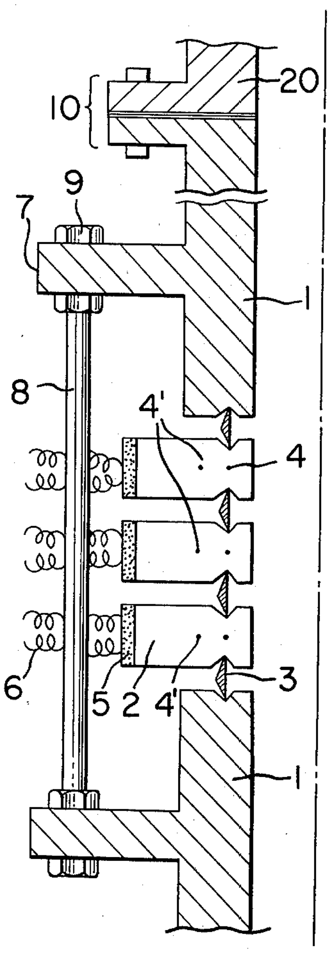
FIG. 4 is a cross-sectional view of an ultrasonic apparatus embodying the present invention, which is illustrative of the case employing a multistage oscillating member composed of a plural number of the same oscillating member as shown in FIG. 3 as interconnected through each triangular packing.

FIG. 4 is illustrative of an apparatus embodying the present invention wherein the above described oscillating member is installed in multistage fashion, and shown herein by way of example is a three-stage oscillating member coaxially composed by interconnecting 3 resonators through triangular packings. In the case of an apparatus provided with a multistage oscillating member composed of a plural number of resonators in such a fashion, it has such an effect that, at the time of heating a long object like the insulating material for electric wires and cables, said insulating material can be heated widely and uniformly so that the speed of manufacturing electric wires and cables can be increased.

As an alternative means for achieving such an effect, it is conceivable to prepare a very big resonator. But, according to the current technique, it is difficult to manufacture a big piezo-electric element capable of resonating such a big metal ring body, or, granting that it is possible, there are various troubles to solve in regard to the mechanical strength and electrical properties so that it is unsuitable for practical use. For the reasons as above, it is perferable to apply such a multistage oscillating member as proposed in the present invention.

Figure 5:
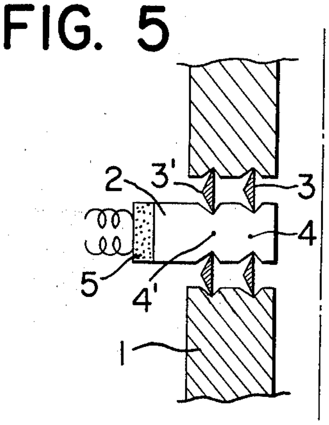
FIG. 5 is a cross-sectional view of an ultrasonic apparatus embodying the present invention, which is illustrative of the case wherein a plural number of triangular packings are employed as the ultrasonic wave transfer preventive member.

In an apparatus constructed as above, it was anticipated that such problems as the pressure seal and the ultrasonic wave loss might crop up. However, it has been found that, even in the case of a multistage apparatus as above, ultrasonic waves can be efficiently transferred to an object even when the triangular packing is considerably tightened. Also, it has been found that, even when said triangular packing is disposed on a node other than the node 4, for instance, the node 4' of ulrtrasonic waves in the resonator as shown in FIG. 5, ultrasonic waves can be effectively transferred to an object within the tube. And, the provision of a plural number of triangular packings on the resonator in this way e.g., at the nodal points 4, 4' will not only enhance the mechanical strength of the apparatus as a whole but also make the pressure seal more complete.

Hereunder will be given some examples of the practical use of the above described apparatuses.

Example 1

By using an ultrasonic apparatus such as shown in FIG. 3 employing an iron triangular packing 3 and containing hot water as the medium in the metal tube 1, a streak of polyethylene having a diameter of 6 mm was introduced into said hot water. When ultrasonic waves were applied to said polyethylene by setting the output of the ultrasonic wave generator at 600 W and the frequency at 350 KHz, the temperature of the polyethylene ascended to 100°C in 12 seconds. On the contrary, in the case of using a conventional ultrasonic apparatus composed by welding the resonator and the metal tube together, it took 115 seconds to raise the temperature of polyethylene up to 100°C under the same conditions as applied to the foregoing apparatus.

Example 2

By using an ultrasonic apparatus such as shown in FIG. 3 employing a stainless-steel triangular packing 3 and a metal tube 1 containing water having a temperature of 25°C as the medium and holding an internal pressure of 50 $Kg/cm^2$, ultrasonic waves were applied through the same procedure as in the Example 1 except for setting the frequency at 500 KHz. As a result, the temperature of polyethylene ascended to 100°C in 9 seconds. On the contrary, in the case of using a conventional ultrasonic apparatus composed by welding the resonator and the metal tube together, it took 102 seconds to raise the temperature of polyethylene up to 100°C under the same conditions as applied to the foregoing apparatus.

As is evident from the present example, in the case of the apparatus according to the present invention, even when the internal pressure is thus applied to augment the clamping force of the bolt and nut and ultrasonic waves with high frequency and short wavelength are employed, it is possible to raise the temperature of said polyethylene to an intended temperature in a very short period of time. This verifies that ultrasonic waves are efficiently transferred to the object with little loss thereof.

As will be understood from the foregoing, the mechanism of preventing the transfer of ultrasonic waves to any parts other than the object matter by virtue of a packing so shaped as to render the connection between the tube and the resonator through a line contact thereof in particular is very useful, and especially an apparatus employing a ring packing having a triangular cross-section renders it possible to elevate the internal pressure of the tube and is very effective for the utilization of ultrasonic waves of high frequency.

Figure 6:
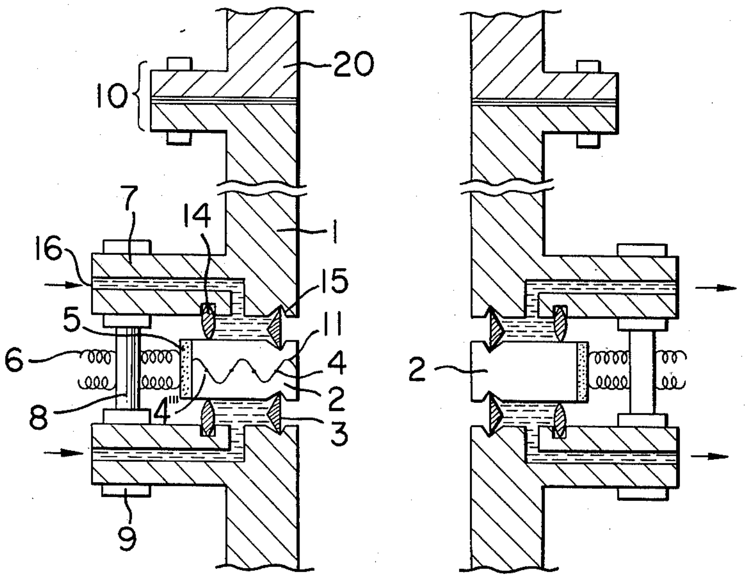
FIG. 6 is a cross-sectional view of an ultrasonic apparatus embodying the present invention, which is illustrative of the case wherein a device for cooling the oscillating member is provided.
Figure 7:
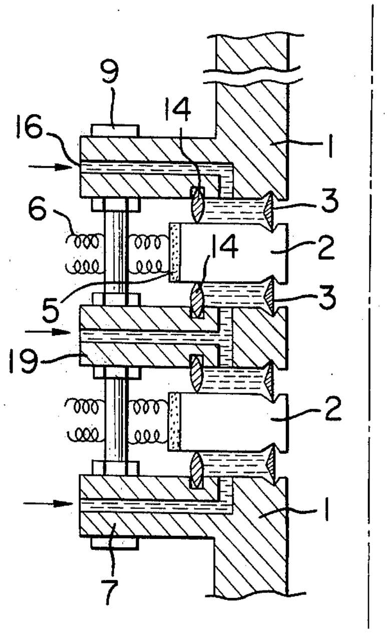
FIG. 7 is a cross-sectional view of an ultrasonic apparatus embodying the present invention, which is illustrative of the case employing a multistage oscillating member composed of a plural number of the same oscillating member as shown in FIG. 6 as interconnected through metal tubes.

Next, an ultrasonic apparatus having such a structure as permitting the use of the piezo-electric element at a low and fixed temperature on the occasion of employing the oscillating member within a high-temperature medium in the foregoing apparatus will be elucidated hereunder with reference to the accompanying drawings. FIG. 6 is a cross-sectional view of the essential part of an example of said apparatus, and FIG. 7 is a diagrammatic cross-sectional view of another example of said apparatus provided with a plural number of said oscillating member.

Referring to FIG. 6, a ring packing 3 having, for instance, a triangular cross-section is installed between the aforesaid resonator 2 and the metal tube 1, or between a couple of resonators, or between two adjoining resonators of a multistage oscillating member composed by interposing another metal tubes 19, at a position corresponding to the node 4 of ultrasonic waves within the resonator near by the medium (the inner wall side of the metal tube). This triangular packing 3 is ordinarily made of metal, and it works to mechanically connect the tube with the resonator 2 and hold them. And, as to the configuration of this packing, a shape rendering a minimum area of contact between the resonator and the tube, e.g., a line contact, like the foregoing triangular packing, is chosen. Such a triangular packing as shown in the drawing can naturally works as a seal against the internal pressure concurrently.

The reference numeral 14 denotes the packing for the purpose of forming the cooling medium receiving space 15 in cooperation with the triangular packing 3. The principal role of the packing 14 is to function as the seal for the cooling medium, so that varieties of conventional packings are applicable. A ring made of plastics, rubber, etc. are simple for use and applied to this packing by preference. Metal packings are of course suitable; especially such one as rendering the smallest possible area of contact between the resonator and the tube can minimize the loss of ultrasonic waves. In the case where the mechanical strength must be considered, it will do to use a metal packing rendering a line contact such as the foregoing packing 3. However, the position of said packing 14 must be covering a node of ultrasonic waves. 16 denotes the passage for introducing a cooling medium into the space 15. In the drawing, said passage is provided by boring a hole in the flange 17 of the tube 1. This passage 16 may be directly provided on the tube as long as the pressure resistivity of the tube 1 is within the standard value, but it is naturally prohibited to provide it in such a way as to cause a decrease in strength of the tube. The provision of the flange 17 as shown in the drawing is based on due consideration of the mechanical strength as well as the safety of the tube 1 and the apparatus as a whole.

As the cooling medium, cold water is usually applied, and it will do to let it flow in the direction of the arrow. As for the flow rate, speed and kind of the cold medium, the optimum conditions are chosen according to the apparatus to be employed and the conditions of operation thereof.

FIG. 7 is illustrative of a modification of the apparatus shown in FIG. 6, which modification is intended to facilitate the wide, uniform heating of an object and increase the speed of heating a moving object by virtue of the employment of the resonator 2 in multistage fashion. In forming such a multistage apparatus, it is also conceivable to arrange the resonators by disposing the packings 3, 14 directly between each two adjoining resonators as shown in FIG. 4, but this way is not so desirable because there is a problem from the view point of mechanical strength and the passage is required to be provided directly on the resonator. Besides, when the strength is taken into consideration, the packing 14 comes to be one similar to the packing 3. The apparatus shown in FIG. 7 is a desirable one which is free from the foregoing troubles, and it is composed by interposing or annular metallic disk (or ring) 19 between two resonators 2. Said metal disk 19 is not limited in configuration to such one as shown in the drawing; it can be of any shape as long as it renders it possible to simply provide the passage for the cooling medium and its mechanical strength is within the datum value of resistivity of the pressure seal. In this connection, even when the number of resonators in this multistage structure was further increased, there was observed little loss of ultrasonic waves.

Hereunder will be given some examples of the practical use of the foregoing apparatus.

Example 3

By applying an iron triangular packing as the packing 3, introducing hot water as the medium into the tube 1, installing a conventional O-shaped plastic ring as the packing 14, the assembly was clamped by means of the bolt and nut 9, the torque on which was set at 1000 Kg-cm. Then, while pouring cold water into the passage 16, a streak of polyethylene having a diameter of 6 mm was introduced into said hot water and ultrasonic waves were applied thereto by setting the output of the ultrasonic wave generator at 600 W and the frequency at 350 KHz. It took 12 seconds to raise the temperature of polyethylene up to 100°C. This effect is almost equal to that in Example 1, and it verified that there was no influence of the O-shaped ring 14. Besides, there was observed no leakage of water from said O-shaped ring.

Example 4

In the apparatus shown in FIG. 3, by introducing steam having a temperature of 200°C and a pressure of 16 $Kg/cm^2$, the temperature of the vicinity of the boundary between the piezo-electric element 5 and the resonator 2 30 minutes thereafter was measured. The result showed that the temperature thereat reached 185°C.

Subsequently, in the apparatus shown in FIG. 6, by pouring cold water having a temperature of about 15°C into the passage 16 at the rate of 3 *l*/min, the temperature was measured under the same conditions as above. As a result, the temperature measured 30 minutes later was about 40°C, while the temperature measured 1 hour later showed little change.

This verifies that the present apparatus is capable of maintaining a fixed temperature.

In this connection, the above description has been centering on the illustration of a ring packing devised to mount in line contact with both the resonator and the metal container, but, for the purpose of accomplishing the object of the present invention, any type of packing will do as long as it is so devised as to come in a line contact with the resonator. That is, all packings having a configuration opposite to bringing on this effect fall within the purview of the present invention.

The ultrasonic wave transfer preventive member according to the present invention has been elucidated hereinabove with reference to concrete examples. The present invention has been accomplished on the basis of the finding that, for the purpose of effectively directing the oscillation of ultrasonic waves to an object within a container such as a metal tube, it is effective to provide an ultrasonic wave transfer preventive member formed by applying such a structure and a means having the ultrasonic wave transfer preventive effect for the joint of a metal ring-shaped oscillating member and said container. And, as the concrete example of said structure and means having the transfer preventive effect to serve for this purpose, the present invention proposes the interposition of various means, namely, a ring packing having a shape rendering it very resistant to transferring ultransonic waves (to wit, such a shape as bringing the packing in a line contact with the resonator). When such a structure as above is employed, ultrasonic waves from the resonator of the oscillating member can be directed to an intended object through the medium without any loss. Besides, by selecting an apposite shape of packing, a sufficient effect of the packing as the pressure seal can also be expected.

Further, by applying a structure capable of introducing a cold medium therein, it is possible to maintain the electromechanical transducing element, such as barium titanate and lead titanate - zirconate, at a low and fixed temperature and secure the stable application of ultrasonic waves over a long period of time and the stability (or prevention of thermal deterioration and so on) of the electromechanical transducing element.

Moreover, the present apparatus can perform a stable application of ultrasonic waves covering a wdie range of frequency (from an ordinary frequency of about 20 – 50 KHz to 1000 KHz – several MHz), and therefore, it can serve for various uses. Particularly, it can effectively utilize ultransonic waves having a frequency of 100 KHz – 1 MHz under the condition of high pressure and high temperature.

It was found to be effective also in the apparatus of the present invention to utilize a talc porcelain tube having a diameter of 14 to 15 cm, as an example of ceramics, in lieu of is metal tube. This ceramic tube is advantageous in it structural stability because it is less expansible than the metal tube.

The present apparatus is applicable not only to the manufacture of electric wires and cables, but also to the effectuation of, for instance, polymerization, depolymerization or chemical reaction of macromolecules in the field of chemical industry, aggregation of suspended matters, emulsification or pulverization of substances contained in a liquid, sterilization of water, etc. in the medical or biological field, the field of mechanical engineering, and other conventional fields of application.

What is claimed is:

1. An ultrasonic apparatus of substantially tubular form for transmitting ultrasonic waves to a fluid contained therein, comprising:

a container of tubular form including a pair of axially spaced annular wall segments;

at least one ring-shaped metallic resonator, spaced coaxially between said container segments, and means including an ultrasonic wave transducing element on the radially outer edge of each said resonator for oscillating ultrasonic waves to the interior of said container radially through said resonator;

a ring-shaped metal ultrasonic wave transfer preventive member at each end of said resonator, each said preventive member having an axially pointed cross section end pressed in tight line contact against the opposed end of said resonator at a nodal portion of the ultrasonic waves transferred by said resonator, and means pressing at least one said ring-shaped resonator and a pair of said preventative members contacting opposite ends of said resonator in an axially extending stack between the ends of said spaced container segments for continuing the central opening of said tubular container therethrough;

whereby said preventative members limit loss of ultrasonic energy to said container segments and act as seals to prevent radial outward loss of a fluid medium from said container.

2. An ultrasonic apparatus as claimed in claim 1, wherein said container is of metal.

3. An ultrasonic apparatus as claimed in claim 1, wherein said ultrasonic wave transfer preventive member is in line contact with said container at a position corresponding to the node of ultrasonic waves transmitted through said resonator.

4. An ultrasonic apparatus as claimed in claim 3, wherein said ring-shaped preventive member is triangular in cross section and engages said resonator at one apex thereof.

5. An ultrasonic apparatus as claimed in claim 3, wherein said ring-shaped preventive member is rhombic in cross section and engages said resonator at one apex thereof.

6. An ultrasonic apparatus according to claim 1, including a plural number of ring-shaped ultrasonic wave transfer preventive members of differing radius, each in line contact with the resonator at radially spaced nodal positions, said preventive members connecting said resonator and one end of a segment of the container, and therewith closing an annular space into which a cooling medium can be introduced.

7. An ultrasonic apparatus, comprising:

a container of tubular form including at least one peripheral wall segment;

at least one ring-shaped or tube-shaped metallic resonator, adjacent the end of said container segment, and means including an ultrasonic wave transducing element on the outer edge of said resonator for oscillating ultrasonic waves to the interior of said container through said resonator;

a plural number of ring-shaped ultrasonic wave transfer preventive members of differing radius, each in line contact with at least the end of the resonator at radially spaced nodal positions of the ultrasonic waves transferred by said resonator, said preventive members connecting said resonator and one end of a segment of the container, and therewith closing an annular space into which a cooling medium can be introduced;

means defining passages in said container for said cooling medium, said passages having internal ends opening into said spaces axially between the resonator and container ends and radially between the spaced-apart preventive members for flowing said cooling medium therethrough, said passages having further ends opening externally of said container for supply and exhaust of said cooling medium, so as to enable close control of the temperature of said oscillating member.

8. An ultrasonic apparatus according to claim 7, in which a plurality of resonators are provided in axially spaced relation between opposed ends of segments of the container, and including an annular disk loosely interposed between two such resonators and interconnected therewith at each end of said disk by radially spaced annular preventive members for defining annular cooling spaces between said disk and said resonators, said disk having internal coolant passages opening to said cooling spaces, said coolant passages having cooling medium supply and exhaust ends opening externally of said apparatus, and including means axially and compressibly interconnecting said disk and container segments radially outboard of said cooling spaces for compressively sandwiching said resonators and disk, as well as the intervening preventive members, between said container segments.

9. An ultrasonic apparatus as claimed in claim 1, wherein said preventive member is in line contact with a circular, V-section groove cut in the end face of the resonator.

10. An ultrasonic apparatus as claimed in claim 1, including a plurality of said ringlike resonators disposed axially between said spaced segments of the container and facing into said container, and ones of said ringlike preventive members axially interconnecting and engaging end faces of the resonators in line contact therewith whereby to peripherally enclose the axial space between said container segments.

11. An ultrasonic apparatus as claimed in claim 1, including plural axially spaced ones of said ringlike resonators interposed axially between a pair of spaced segments of said container, said ring axially interposed between an adjacent pair of said ringlike resonators, ones of said preventive members being interposed between adjacent ones of resonators, ring and container segments and in line contact with the resonators, and thereby peripherally enclosing the axial space between said container segments.

12. An ultrasonic apparatus as claimed in claim 1, wherein said preventive members are integrally formed with said tubular segments.

13. An ultrasonic apparatus as claimed in claim 1, in which said pair of container segments are spaced by an axial gap, at least one said ringlike resonator being disposed in said gap and continuing the central opening of the tubular container therethrough, said metallic preventive members axially engaging V-cross section circular grooves in said container segments and at nodal portions of the resonator for limiting transfer of ultrasonic energy from said resonator to said container sections, said pressing means including radial flanges on each of said container segments, and axial tensioning means connecting said flanges and axially pressing the pointed cross-section portions of said preventive members against the bottoms of the V-cross section grooves in said resonator and container sections for sealing said gap against leakage therethrough of a medium from said container.

14. An ultrasonic apparatus as claimed in claim 1, in which said container segments are axially spaced by a gap, a said ringlike resonator being loosely disposed in said gap and including first and second ring-like transfer preventive members connecting an axial end of the adjacent said resonator to the opposed end of each container segment, said first and second ringlike preventive members being concentrically spaced at different nodes of the ultrasonic waves transferred by said resonator for preventing transfer of ultrasonic energy from said resonator to said adjacent container segment, said pressing means being associated with said container segments for compressively seating the pointed cross section edge of each said ringlike preventive member against the end of the opposed resonator.

15. An apparatus as claimed in claim 1, wherein a plural number of radially coplanar ringlike preventive members each provide a line contact between said resonator and a surface axially spaced therefrom and fixed with respect to the adjacent segment of said container.

* * * * *